Nov. 23, 1926.
F. E. BOWMAN
1,608,364
INSIDE PIPE WRENCH AND NIPPLE CHUCK
Filed March 30, 1925 2 Sheets-Sheet 1
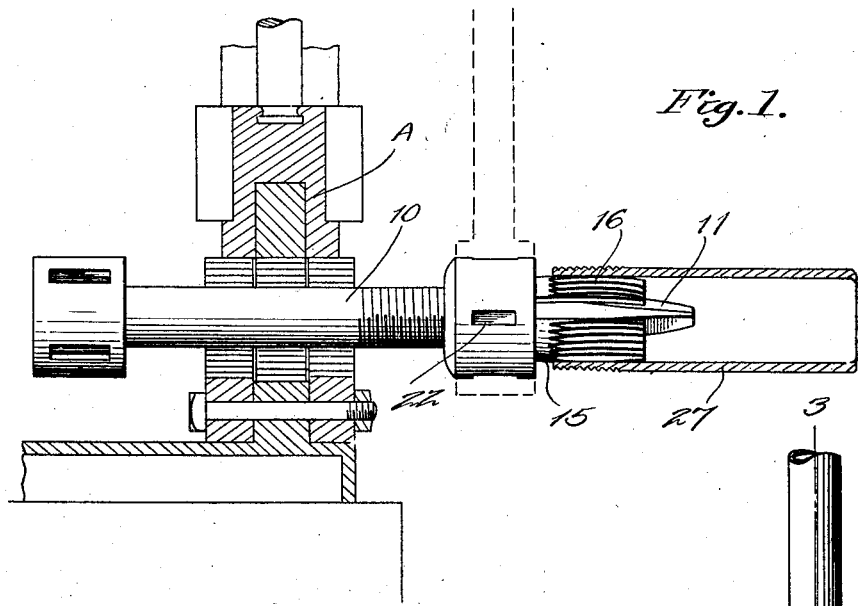
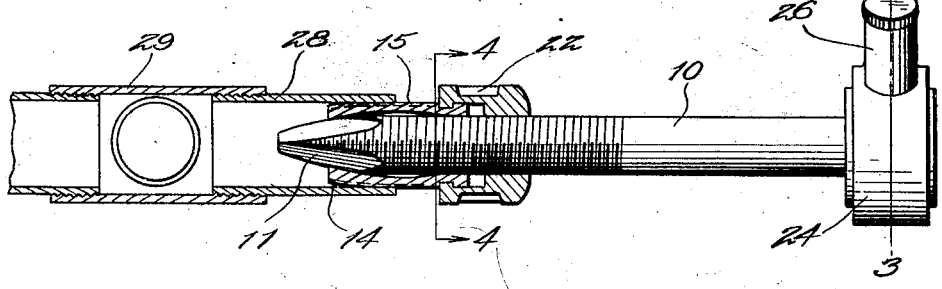
Fred E. Bowman
INVENTOR
BY Victor J. Evans
ATTORNEY

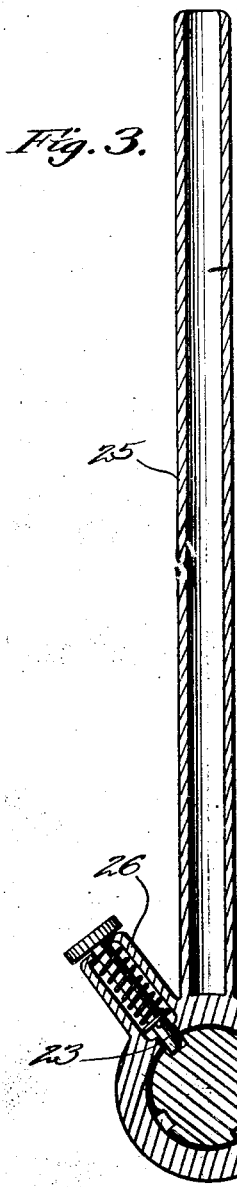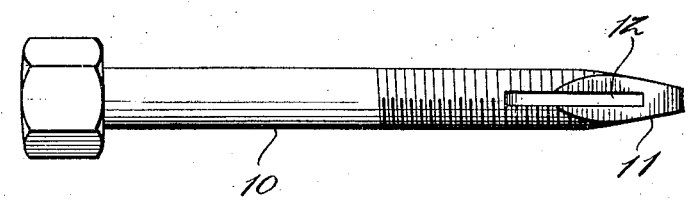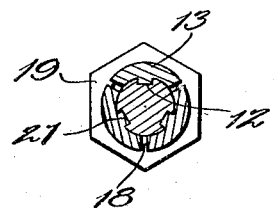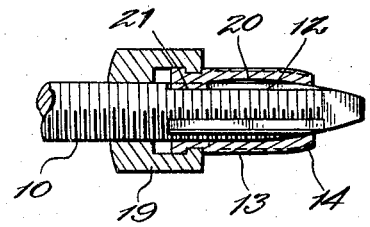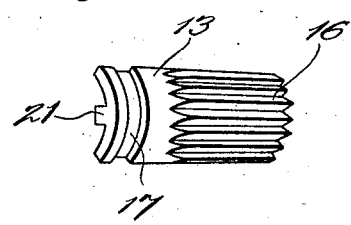

Patented Nov. 23, 1926.

1,608,364

UNITED STATES PATENT OFFICE.

FRED E. BOWMAN, OF ANCHORAGE, TERRITORY OF ALASKA.

INSIDE PIPE WRENCH AND NIPPLE CHUCK.

Application filed March 30, 1925, Serial No. 19,451, and in Great Britain August 18, 1925.

This invention contemplates the provision of a device designed to facilitate the removal of a broken or short piece of pipe from a fitting or union, and is also particularly useful in rigidly supporting a piece of pipe while threads are being cut thereon, the invention residing in the construction, combination, and arrangement of parts as claimed.

In the drawings forming part of this application, like numerals of reference indicate similar parts in the several views, and wherein:

Fig. 1 is a view partly in section showing how the device is used for supporting a piece of pipe to be threaded;

Fig. 2 is a view partly in section showing how the tool is used to remove a piece of pipe from a fitting or union;

Fig. 3 is a view of the wrench;

Fig. 4 is a sectional view taken on line 4—4 of Fig. 2;

Fig. 5 is a detail view of the bolt;

Fig. 6 is a fragmentary sectional view showing how the expanding sleeve is associated with the bolt; and Fig. 7 is a fragmentary perspective view of the sleeve.

The device forming the subject-matter of this invention comprises a threaded bolt 10, one end of which is tapered as at 11, while the bolt is formed adjacent its tapered end with a plurality of longitudinally disposed slots 12. In each of these slots is arranged an element 13 which has its outer surface tapered at one end as at 14, and which element at its other end is spaced a slight distance from the end of the slot 12 for a purpose to be presently described. Arranged upon the bolt 10 is a sleeve 15 which is fluted as at 16 and formed adjacent one end with an annular groove 17 to receive the flange 18 of the nut 19 which is threaded upon the bolt thus providing a swivel connection between the nut and said sleeve. It will be noted upon an inspection of Fig. 6 that the sleeve is slightly concaved on the inside as at 20 so that the bolt 10 can pass freely through the sleeve, and the latter caused to effectively engage the work, but that the opposite ends of this sleeve contact the bolt 10 and the tapered portions 14 of the expanding elements 13 respectively. The sleeve is formed with internal lugs 21 which are arranged within the slots 12 of the bolt at points directly behind the expanding elements 13. These elements project a slight distance beyond the bolt for a purpose to be presently described. The nut 19 is also provided with depressions 22 to receive the spring pressed pin 23 forming part of the ratchet wrench, which includes an annulus 24 and a handle 25. The annulus is adapted to be slipped over the nut 19, and the spring pressed pin 23 which operates within a hollow boss 26 projecting from said annulus.

As above stated the tool is particularly advantageous for supporting a nipple or piece of pipe 27 while it is being threaded, and this use of the invention is clearly illustrated in Fig. 1, wherein it will be noted that the fluted sleeve is positioned within one end of the nipple 27. The ratchet wrench is then placed upon the nut 19, the bolt having first been arranged within a suitable vise indicated generally at A. Now when the nut is turned upon the threaded bolt, the sleeve 15 is moved longitudinally on the bolt, being prevented from rotating thereon by means of the lugs 21 which are positioned within the slots 12. As this sleeve 15 moves longitudinally on the expanding elements 13, the sleeve is expanded to effectively grip the interior of the nipple 27, and thus firmly hold the nipple immovable while it is being threaded.

The invention can also be used to good advantage in removing a nipple or a length of pipe 28 from a union or fitting 29, this use of the tool being clearly shown in Fig. 2. For this purpose the sleeve 15 together with the bolt 10 is inserted in one end of the nipple 28, after which the wrench is removed from the head of the bolt and positioned upon the nut 19. The wrench is ratcheted about the nut, and used to rotate the nut 19 to cause the sleeve 15 to be moved upon the bolt over the expanding elements 13, which of course forces the sleeve into effective engagement with the interior of the sleeve to obtain a firm hold thereon. After the sleeve has been thus forced into firm and effective engagement with the nipple 28, the entire device together with the nipple can be rotated in a proper direction to remove the nipple from the fitting 29.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A device of the character described comprising a bolt having tapered surfaces at one end thereof, a sleeve including a plurality of segmental sections surrounding the bolt and said sections having their inner surfaces concaved and their forward extremities curved to contact with said bolt, each section of the sleeve being fluted and having an arcuate-shaped groove adjacent one end, a nut threaded on the bolt, and including a flange adapted to be received by said grooves, whereby the nut is swivelly connected with said sleeve to allow the latter to be moved longitudinally of the bolt to expand it, said bolt having longitudinal slots for a portion of its length and extending into the tapered surfaces thereof, and a lug projecting from each section of the sleeve and movable in one of said slots to prevent rotation of the sleeve upon the bolt.

In testimony whereof I affix my signature.

FRED E. BOWMAN.